United States Patent Office 3,349,029
Patented Oct. 24, 1967

3,349,029
CARBON AND WATER RECOVERY
Jen-Pu Cheng, St. Louis, Mo., assignor to Petrolite Corporation, Wilmington, Del., a corporation of Delaware
No Drawing. Filed July 20, 1964, Ser. No. 383,902
25 Claims. (Cl. 210—21)

This invention relates to the recovery of finely divided carbon from an aqueous medium. This invention also relates to the production of water capable of reuse by removing finely divided carbon therefrom. More particularly this invention relates to the recovery of finely divided carbon from quench water employed in the controlled oxidation of hydrocarbons. "Quench water" is water employed in cooling the effluent gases by directly contacting the water with said gases.

For many years synthesis gas, a mixture of hydrogen and carbon monoxide, has been manufactured by the water gas reaction which involves reacting coal with air and steam.

The first petroleum based process for the production of synthesis gas was the methane-steam reaction employing a catalyst. The most recent method for synthesis gas manufacture involves the partial oxidation of hydrocarbon fuels by a non-catalytic process, for example where methane, propane, butane, various petroleum distillates and residues, lignite and bituminous and anthracite coal are oxidized at pressure ranging, for example, from atmospheric to 500 p.s.i. using oxygen concentrations which may range from that of atmospheric to pure oxygen.

Processes relating to the controlled oxidation of hydrocarbons where the presence of finely divided carbon particles in the quench water pose a problem are well know. The following are examples of such processes. Flow diagrams of such processes may be found in Petroleum Refiner—The 1963 Petrochemical Handbook Issue, November 1963 on the pages indicated:

(1) Process for the Manufacture of Acetylene From Natural Gas (Hydrocarbon Research, Inc., Delhi-Taylor Oil Corp.), page 136.
(2) Process for the Manufacture of Acetylene From Natural Gas Rich in Methane (Montecatini), page 137.
(3) Process for the Manufacture of Ethylene From Light and Heavy Naphtha Fractions (Petrocarbon Developments, Limited), page 169.
(4) Manufacture of Synthesis Gas From Hydrocarbons (Shell Development Co.), page 224.
(5) The Texaco Development Corporation Process for the Manufacture of Synthesis Gas—a Mixture Rich in Hydrogen and Carbon Monoxide From Hydrocarbons—described in Industrial and Engineering Chemistry, vol. 48, #7, pages 1118–1122.

The above processes are merely illustrative and not intended to be limiting.

By way of example, the Texaco Development Corporation process which delivers precisely controlled quantities of fuel, oxygen and other reactants to a carefully shaped refractory lined reactor where the fuel is burned to produce a product which is essentially hydrogen and carbon monoxide in 90–98% concentration, has a quench water cooling system which recovers the sensible heat contained in the reactor effluent gases. In the case of methane, this process is illustrated by the following reactions:

$$4CH_4 + 2O_2 \rightarrow 3CH_4 + CO_2 + 2H_2O$$

$$CH_4 + CO_2 \rightarrow 2CO + 2H_2$$

$$2CH_4 + 2H_2O \rightarrow 2CO + 6H_2$$

However, during the reaction the following reactions also occur:

$$CO + H_2O \rightarrow CO_2 + H_2$$

$$2CO \rightarrow CO_2 + C$$

Thus, carbon particles are formed in the process.

When synthesis gas is to be fed to a water gas shift converter for conversion of carbon monoxide and steam to carbon dioxide and hydrogen, the effluent gases from the reactors are usually quenched by direct contact with cooling water which recovers the sensible heat of the hot gases and generates the steam required in the shift reaction.

Gases from the quench system may also be scrubbed with water to remove unconverted carbon from the product gas. When natural gas is processed, carbon yield is negligible, but with residual oils 0.5 to 4 percent of carbon are obtained, depending on characteristics of the fuel used. Well designed scrubbing systems reduce the carbon content of the final product gas to values well below 5 pounds per million pounds of dry product gas.

It is desirable that carbon scrubbed from the product gas either be recovered as a product or be transferred to the feed stream and recycled to the recator so that there is no net production of carbon from the process.

Without a suitable method of carbon removal the presence of carbon in the quench water poses operational as well as economical problems. Such water cannot be recycled due to the requirement of clean water for quenching. It cannot be disposed of either due to the pollution problem it creates. Furthermore, if carbon black is not converted to desired products or to energy capable of being employed in the process, the economic feasibility and competitiveness of the process is decreased. Moreover, since the process is continuous it is highly desirable that carbon black be rapidly and continuously removed during the process.

At present, carbon is recovered from the quench water by filtration or extraction with light solvents such as naphtha. The disadvantages of the filtration process is that carbon black is extremely difficult to filter because of its fine particle size and because the filter cake recovered is voluminous and contains large quantities of water making it impossible to burn the resulting wet cake. On the other hand, when the cake is placed in huge outdoor piles and allowed to dry, the carbon black not only tends to blow away but it is also a fire hazard.

To avoid the difficulties associated with the filtration of the aqueous slurry, the carbon particles are extracted from the aqueous slurry by means of naphtha. Since it is desirable to employ an inexpensive heavy oil in the process, such as bunker fuel or any other inexpensive residual oil, the use of naphtha increases the cost of the process. Furthermore, bunker oils or other heavy oils cannot be employed in the extraction process. Therefore, extractive naphtha must be recovered and recycled in the process thus increasing the cost of the process.

In the recovery system, carbon-containing naphtha may be mixed with the heavy oil, distilled in a oil-stripper, recovered in the oil-stripper overhead, and returned to the extraction system. The oil-carbon bottoms from the oil-stripper may be burned in plant boilers or other heaters, in the process-feed heaters for the generators, or by recycling to the generator.

I have now discovered that finely divided carbon particles can be removed from an aqueous medium by a process which comprises (1) Treating the carbon particles with a sufficient amount of a surfactant capable of rendering these particles hydrophobic;

(2) Contacting said hydrophobic carbon particles with sufficient water insoluble solvent, such as a liquid hydrocarbon, preferably the oil employed in the process, to transform the carbon particles to larger dry units such as beads, balls, etc. If too much solvent is used, the dry balls, beads, etc. of carbon particles are transformed into a paste or slurry which is difficult to handle;

(3) Separating said balls from the aqueous medium by any suitable means such as filtration, flotations, etc. Where flotation is desired, it is advantageous to disperse gases such as nitrogen or air into the system so that the gas can attach itself to the balls and float them off.

Thus, the process is carried out by treating the quench water with a surfactant capable of rendering the carbon black hydrophobic and treating said hydrophobic carbon black with a water insoluble liquid, such as a hydrocarbon. Sufficient surfactant is added to render the particles of carbon black hydrophobic. Although the amount of surfactant employed will vary with the specific surfactant and the system, in practice I generally employ at least about 20 p.p.m., such as about 20 to 500 p.p.m., for example about 30 to 200 p.p.m. but preferably about 50 to 130 p.p.m. based on the volume of the system. Larger amounts of surfactant can also be employed but there is generally no economic advantage in so doing. For optimum performance in a commercial operation the amount of solvent employed is critical. In practice sufficient solvent is employed to cause the fine particles of carbon to coagulate into discrete clumps or balls which can be facilely removed from the system by any suitable means such as, for example, filtation, flotation and the like. Generally, I add to the system at least about 0.5% solvent, such as about 0.5 to 6%, for example about 0.9 to 4%, but preferably about 1.2 to 3.2% based on the volume of the system. If too much or too little solvent is employed, the optimum effect is not achieved for otherwise the easily handled discreet clumps are not obtained. Instead the carbon is either powdery or a wet paste is formed which are difficult to handle.

In the preferred embodiment the clumps are separated from the water and dispersed into the hydrocarbon being fed to the reactor. In this way increased yields are obtained by oxidizing the carbon particles to the desired products. Stated another way, by this technique the overall yield of the process is increased.

THE SURFACTANTS

A wide variety of surfactants capable of rendering carbon hydrophobic can be employed in this invention. The chemical nature and structure of the surfactant are not important except as they relate to this function of rendering the carbon particles hydrophobic.

In general, all classes of surfactants can be employed in this invention including anionic, cationic, non-ionic and ampholytic surfactants provided they can render carbon particles hydrophobic.

As is evident, the subclasses and species under the above classes are legion. To enumerate all surfactants that can be employed in this invention would be unnecessary and would render the specification too voluminous. Therefore, I shall merely present the general types of surfactants which can be employed in this invention and more fully describe certain preferred types of surfactants which are illustrated by specific examples.

An excellent discussion of surfactants can be found in the texts, "Surface Active Agents and Detergents" by Schwartz et al. vol. I, 1949, vol. II, 1958), Interscience Publishers, New York, which volumes are by reference incorporated into the present application. In vol. I of these textbooks is a classification scheme that is useful in a general representation of useful surfactants.

I. *Anionic*

A. Carboxylic acids:
 (1) Carboxyl joined directly to the hydrophobic group (subclassification on basis of the hydrophobic group, e.g., fatty acid soaps, rosin soaps, etc.
 (2) Carboxyl joined through an intermediate linkage.
  (a) Amide group as intermediate link.
  (b) Ester group as intermediate link.
  (c) Sulfonamide group as intermediate link.
  (d) Miscellaneous intermediate links, ether, —$SO_2$—, —S—, etc.
B. Sulfuric esters (sulfates):
 (1) Sulfate joined directly to hydrophobic group.
  (a) Hydrophobic group contains no other polar structure (sulfated alcohol and sulfated olefin type).
  (b) Sulfuric esters with hydrophobic groups containing other polar structures (sulfated oil-type).
 (2) Sulfate group joined through intermediate linkage.
  (a) Ester linkage (Arctic Syntex M. type).
  (b) Amide linkage (Xynomine type).
  (c) Ether linkage (Triton 770 type).
  (d) Miscellaneous linkages (e.g., oxyalkylimidazole sulfates).
C. Alkane sulfonic acids:
 (1) Sulfonic group directly linked.
  (a) Hydrophobic group bears other polar substituents ("highly sulfated oil" type). Chloro, hydroxy, acetoxy, and olefin sulfonic acids (Nytron type).
  (b) Unsubstituted alkane sulfonic acids (MP 189 type; also cetane sulfo acid type).
  (c) Miscellaneous sulfonic acids of uncertain structure, e.g., oxidation products of sulfurized olefins, sulfonated rosin, etc.
 (2) Sulfonic groups joined through intermediate linkage.
  (a) Ester linkage.
   (1) RCOO—X—$SO_3H$ (Igepon AP type).
   (2) ROOC—X—$SO_3H$ (Aerosol and Sulfoacetate type).
  (b) Amide linkage.
   (1) RCONH—X—$SO_3H$ (Igepon T type).
   (2) RNHOC—X—$SO_3H$ (sulfosuccinamide type).
  (c) Ether linkage (Triton 720 type).
  (d) Miscellaneous linkages and two or more linkages.
D. Alkyl aromatic sulfonic acids:
 (1) Hydrophobic group joined directly to sulfonated aromatic nucleous (subclasses on basis of nature of hydrophobic group. Alkyl phenols, terpene, and rosin-aromatic condensates, alkyl aromatic ketones, etc.).
 (2) Hydrophobic group joined to sulfonated aromatic nucleous through an intermediate linkage.
  (a) Ester linkage (sulfophthalates, sulfobenzoates).
  (b) Amide and imide linkages.
   (1) R—CONH—Ar$SO_3H$ type.
   (2) Sulfobenzamide type.
  (c) Ether linkage (alkyl phenyl ether type).
  (d) Heterocyclic linkage (Ultravon type, etc.).
  (e) Miscellaneous and two or more links.
E. Miscellaneous anionic hydrophilic groups:
 (1) Phosphates and phosphonic acids.
 (2) Persulfates, thiosulfates, etc.
 (3) Sulfonamides.
 (4) Sulfamic acids, etc.

II. *Cationic*

A. Amine salts (primary, secondary, and tertiary amines):
 (1) Amino group joined directly to hydrophobic group.

(a) Aliphatic and aromatic amino groups.
(b) Amino group is part of a heterocycle (Alkaterge type).
(2) Amino group joined through an intermediate link.
(a) Ester link.
(b) Amide link.
(c) Ether link.
(d) Miscellaneous links.

B. Quaternary ammonium compounds:
(1) Nitrogen joined directly to hydrophilic group.
(2) Nitrogen joined through an intermediate link.
(a) Ester link.
(b) Amide link.
(c) Ether link.
(d) Miscellaneous links.

C. Other nitrogenous bases:
(1) Non-quaternary bases (classified as guanidine, thiuronium salts, etc.).
(2) Quaternary bases.

D. Non-nitrogenous bases:
(1) Phosphonium compounds.
(2) Sulfonium compounds, etc.

III. Non-Ionic

A. Ether linkage to solubilizing groups.
B. Ester linkage.
C. Amide linkage.
D. Miscellaneous linkages.
E. Multiple linkages.

IV. Ampholytic

A. Amino and carboxy:
(1) Non-quaternary.
(2) Quaternary.
B. Amino and sulfuric ester:
(1) Non-quaternary.
(2) Quaternary.
C. Amine and alkane sulfonic acid.
D. Amine and aromatic sulfonic acid.
E. Miscellaneous combinations of basic and acidic groups.

Examples of specific commercial surfactants useful in the present invention include those disclosed in "Emulsions Theory and Practice," by Paul Becker, ACS Monograph No. 135, Reinhold Publishing Corp., 1957, pp. 337–371, which are hereby incorporated by reference into the present specification.

As is quite evident, new surfactants capable of rendering carbon hydrophobic will be constantly developed which could be useful in this invention. It is, therefore, not only impossible to attempt a comprehensive catalogue of such compositions, but to attempt to describe the invention in its broader aspects in terms of specific chemical names of its components used would be too voluminous and unnecessary since one skilled in the art could by following the description of the invention herein select a useful surfactant. This invention lies in the use of suitable surfactants capable of rendering carbon hydrophobic and their individual compositions are important only in the sense that their properties can affect this function. To precisely define each specific useful surfactant in light of the present disclosure would merely call for chemical knowledge within the skill of the art in a manner analogous to a mechanical engineer who prescribes in the construction of a machine the proper materials and the proper dimensions thereof. From the description in this specification and with the knowledge of a chemist, one will know or deduce with confidence the applicability or specific surfactants suitable for this invention by applying them in the process set forth herein. In analogy to the case of a machine, wherein the use of certain materials of construction or dimensions of parts would lead to no practical useful result, various materials will be rejected as inapplicable where others would be operative. One can obviously assume that no one will wish to use a useless surfactant nor will be misled because it is possible to misapply the teachings of the present disclosure to do so. Thus, any surfactant that can perform the function stated herein can be employed.

The following test were devised to evaluate surfactants for use in the present invention:

Five samples of carbon slurry quency water containing about 25, 50, 75, 100 and 125 p.p.m. of the surfactant to be tested are each placed in a 100 ml. sealed graduate and about 1.75–2.28% of oil are added. The contents thereof, heated to 140° F., are well shaken. If dry beads form at the surface, the surfactant is satisfactory.

The following examples are presented by way of illustration and not of limitation.

EXAMPLE

A plant, designed according to the Texaco Development Corporation process for manufacturing synthesis gas rich in hydrogen from combustion of a reduced crude of 25° API gravity, discharged a 0.69% by weight carbon slurry effluent in its quench water. A surfactant, capable of rendering the carbon particles hydrophobic, was added to this effluent quench water containing the carbon slurry at a rate of 50–150 p.p.m. based on effluent water volume.

Thereupon the reduced crude feed employed in the process was added to the carbon particle slurry containing the surfactant at a rate of 1.5 to 5.0% by volume, based on effluent water, and these were then mixed in the presence of a flotation gas such as air or nitrogen with a degree of turbulence sufficient to contact the air, treated carbon particles and reduced crude. The aqueous slurry was permitted to flow into a vessel in which the rate of mixing was reduced to allow agglomeration of carbon particles into spherical groups by multiple impact and collision. The relatively dry beads of carbon floated to the surface where they could be recovered by a skimming operation.

The above process was repeated employing the following surfactants with comparable results:

(A) A p-tertiary butyl phenol-formaldehyde resin reacted with ethylene oxide and propylene oxide (EtO:PrO: resin weight ratios of 25:22:1).

(For other examples of suitable oxyalkylated phenolaldehyde resins, see U.S. Patent 2,499,365 which is by reference incorporated into the present application.)

(B) Reaction product of polymerized dodecenyl succinic anhydride with tetraethylene pentamine in ratios of one mole of amine for each anhydride group.

(For other examples of alkenyl succinic anhydride with various amines see U.S. Patents 2,604,451, 2,568,876, and 2,540,800 which are by reference incorporated into the present application.)

(C) Hydrochloric acid salt of polymerized mixed ethanolamines, i.e. mixed mono-, di-, and tri-ethanol amines.

(For other examples of polymerized alkanol amine, see U.S. Patent 2,407,895 which is by reference incorporated into the present application.)

(D) Benzyl chloride quaternized polymerized ethanol amines, mixed mono-, di-, and tri-ethanol amines.

(Other quaternaries can be formed for the polyalkanol amines of U.S. Patent 2,407,895 cited above.)

(E) Dichloroethylether quaternary of oleic acid-esterified polymerized ethanolamines, i.e., mixed mono-, di-, and tri-ethanol amines.

(For other examples of similar compositions see U.S. Patent 2,470,829 which is by reference incorporated into the present application.)

(F) Reaction product of a tall oil fatty acids and mixed polyethylene polyamines of the formula

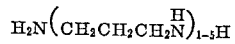

(G) Naphthenic acid (Sunaptic Acid B, Sun Oil Company).

The data contained in the following Tables I and II illustrate the invention:

TABLE I

| | |
|---|---|
| Feed water carbon content | 0.69% wt. |
| Surfactant type | (E). |
| Surfactant addition rate | 80 p.p.m. |
| Processing temperature | 180° F. |
| Fuel oil injection rate | 4.0% vol. |
| Agglomeration time | 2.3 minutes. |
| Air injection rate | 2.5 ft. 3/bbl. feed water. |
| Effluent water | Clear, 90% trans. |
| Carbon Recovered: | |
| Appearance | Discrete spheres, slightly tacky. |
| Particle size | Variable, 0.25–.125 in. diam. |
| Moisture content (water/dist., percent wt.) | 11%. |
| Oil content (dry C basis, percent wt.) | 77%. |
| Redispersion into fuel | Satisfactory. |

TABLE II

| | |
|---|---|
| Feed water carbon content | 0.42% wt. |
| Surfactant type | (G). |
| Surfactant addition rate | 70 p.p.m. |
| Processing temperature | 160° F. |
| Fuel oil injection rate | 1.3% vol. |
| Agglomeration time | 11 minutes |
| Air injection rate | 1.1 ft. 3/bbl. feed. |
| Effluent water | Turbid, 25 p.p.m. solids. |
| Carbon recovered | Dry spheres. |
| Redispersion into fuel | Satisfactory. |

The following examples were carried out to show the effect of varying amounts of solvent on specific surfactants employed in the process. The results are shown in the following Table III:

TABLE III

| Compound: | P.p.m. | Percent Crude | Carbon particles | Water Phase (percent trans.) |
|---|---|---|---|---|
| A | 55 | 1.5 | Fair | 76 |
| A | 65 | 1.5 | do | 77 |
| A | 75 | 1.5 | Good | 77 |
| A | 85 | 1.5 | do | 77 |
| A | 55 | 2.0 | Very good | 67 |
| A | 65 | 2.0 | do | 66 |
| A | 75 | 2.0 | do | 66 |
| A | 85 | 2.0 | Excellent | 57 |
| B | 80 | 1.5 | Poor | 75 |
| B | 90 | 1.5 | do | 75 |
| B | 100 | 1.5 | do | 76 |
| B | 110 | 1.5 | do | 75 |
| B | 80 | 2.0 | Very good | 53 |
| B | 90 | 2.0 | do | 55 |
| B | 100 | 2.0 | do | 60 |
| B | 110 | 2.0 | do | 57 |
| C | 50 | 1.5 | Poor | 82 |
| C | 65 | 1.5 | do | 84 |
| C | 80 | 1.5 | do | 83 |
| C | 95 | 1.5 | do | 82 |
| C | 50 | 1.75 | Fair | 78 |
| C | 65 | 1.75 | Good | 82 |
| C | 80 | 1.75 | Fair | 79 |
| C | 95 | 1.75 | Good | 83 |
| C | 50 | 2.0 | Very good | 76 |
| C | 65 | 2.0 | do | 73 |
| C | 80 | 2.0 | do | 81 |
| C | 95 | 2.0 | do | 78 |

The following examples were carried out to show the effect of varying amounts of solvent on specific surfactants employed in the process. The results are shown in the following continuation of Table III:

TABLE III

| Compound: | P.p.m. | Percent Crude | Carbon particles | Water Phase (percent trans.) |
|---|---|---|---|---|
| D | 55 | 1.5 | Poor | 73 |
| D | 65 | 1.5 | do | 72 |
| D | 75 | 1.5 | Good | 73 |
| D | 85 | 1.5 | do | 74 |
| D | 55 | 2.0 | Fair | 70 |
| D | 65 | 2.0 | Good | 67 |
| D | 75 | 2.0 | do | 69 |
| D | 85 | 2.0 | do | 66 |
| E | 50 | 1.5 | Fair | 86 |
| E | 65 | 1.5 | do | 86 |
| E | 80 | 1.5 | do | 87 |
| E | 95 | 1.5 | do | 87 |
| E | 50 | 1.75 | Good | 83 |
| E | 65 | 1.75 | do | 83 |
| E | 80 | 1.75 | do | 86 |
| E | 95 | 1.75 | do | 87 |
| E | 50 | 2.0 | Very good | 62 |
| E | 65 | 2.0 | do | 64 |
| E | 80 | 2.0 | do | 68 |
| E | 95 | 2.0 | do | 60 |

The following demonstrates that for optimum separation in a specific system the amount of hydrocarbon oil employed in critical to effect optimum separation.

TABLE IV

| Percent Crude | P.p.m. compound "E" | Condition of Water Phase | Condition of Carbon Particles |
|---|---|---|---|
| .89 | 79 | No separation | After 5 mins. settled as untreated soln. |
| 1.34 | 79 | do | Do. |
| 1.58 | 79 | Good | Poor. |
| 1.76 | 65 | do | Do. |
| 1.76 | 79 | do | Do. |
| 2.00 | 65 | Fair | Very good. |
| 2.00 | 79 | do | Do. |
| 2.22 | 65 | do | Do. |
| 2.22 | 79 | Excellent | Poor. |
| 2.67 | 65 | No separation | |
| 2.67 | 79 | do | |

In summary, the present invention relates to a process of removing fine carbon particles from aqueous system by treating the system with a sufficient amount of a surfactant capable of rendering the carbon particles hydrophobic and then treating said system containing hydrophobic carbon particles with a sufficient amount of a water insoluble solvent, such as a hydrocarbon, so as to transform the fine particles into discrete units or balls of carbon which are capable of easy separation. Any surfactant capable of rendering the carbon particles hydrophobic can be employed although certain surfactants are preferred because they are more effective for a particular system at low concentrations. Any substantially water insoluble solvent, but preferably a hydrocarbon of petroleum origin such as that employed as the process feed, can be employed in amounts sufficient to transform the fine particles of carbon to discrete carbon units which can be facilely removed from the system. Although the amounts of water insoluble solvents may vary with the particular system, if too little or too much solvent is employed, optimum removal is not effectively carried out. In general, any hydrocarbon solvent can be employed but it is preferred from a viewpoint of economics to use the hydrocarbon employed as the feed in the process which is usually an inexpensive hydrocarbon. The process is particularly useful in removing fine carbon particles from quench water employed in the oxidation of a hydrocarbon so that the water is substantially free of carbon and can be recycled in the process and the carbon removed converted to useful products such as by recycling in the system.

Various changes and modifications can be made without departing from the spirit of the present invention as defined in the appended claims.

Having thus described my invention what I claim as new and desire to obtain by Letters Patent is:

1. An improved process for recovering finely divided carbon particles from an aqueous medium system containing said finely divided carbon particles comprising (1) treating said finely divided carbon particle-containing aqueous medium system with a sufficient amount of a surfactant capable of rendering said carbon particles hydrophobic, (2) contacting said so-rendered hydrophobic carbon particles wtih sufficient water insoluble solvent to transform said so-rendered carbon particles into larger discrete carbon units, and (3) separating said larger discrete carbon units from said aqueous medium system, thereby producing water capable of reuse.

2. The process of claim 1 where the surfactant is an oxyalkylated phenol-aldehyde resin.

3. The process of claim 1 where the surfactant is the reaction product of a polymerized alkenyl succinic anhydride and an amine.

4. The process of claim 1 where the surfactant is a member selected from the group consisting of a polymerized alkanolamine and an acylated polymerized alkanolamine.

5. The process of claim 1 where the surfactant is a member selected from the group consisting of salts and quaternaries of polymerized alkanolamines.

6. The process of claim 1 where the surfactant is a member selected from the group consisting of salts and quaternaries of acylated polymerized alkanolamines.

7. The process of claim 1 where the surfactant is the reaction product of a fatty acid and an amine.

8. The process of claim 1 where the surfactant is a carboxylic acid.

9. The process of claim 1 wherein said finely divided carbon particle-containing aqueous medium system is quench water used in the controlled oxidation process of hydrocarbons.

10. The process of claim 9 where the surfactant is an oxyalkylated phenol-aldehyde resin.

11. The process of claim 9 where the surfactant is the reaction product of a polymerized alkenyl succinic anhydride and an amine.

12. The process of claim 9 where the surfactant is a member selected from the group consisting of a polymerized alkanolamine and an acylated polymerized alkanolamine.

13. The process of claim 9 where the surfactant is a member selected from the group consisting of salts and quaternaries of polymerized alkanolamines.

14. The process of claim 9 where the surfactant is a member selected from the group consisting of salts and quaternaries of acylated polymerized alkanolamines.

15. The process of claim 9 where the surfactant is the reaction product of a fatty acid and an amine.

16. The process of claim 9 where the surfactant is a carboxylic acid.

17. The process of claim 10 wherein said water insoluble solvent is used in an amount of about 0.5% to about 6.0% by volume of said system.

18. The process of claim 11 wherein said water insoluble solvent is used in an amount of about 0.5% to about 6.0% by volume of said system.

19. The process of claim 12 wherein said water insoluble solvent is used in an amount of about 0.5% to about 6.0% by volume of said system.

20. The process of claim 13 wherein said water insoluble solvent is used in an amount of about 0.5% to about 6.0% by volume of said system.

21. The process of claim 14 wherein said water insoluble solvent is used in an amount of about 0.5% to about 6.0% by volume of said system.

22. The process of claim 15 wherein said water insoluble solvent is used in an amount of about 0.5% to about 6.0% by volume of said system.

23. The process of claim 16 wherein said water insoluble solvent is used in an amount of about 0.5% to about 6.0% by volume of said system.

24. The process of claim 9 wherein said water insoluble solvent is used in an amount of about 0.5% to about 6.0% by volume of said system.

25. The process of claim 9 where the separated larger discrete carbon units are recycled in the oxidation process.

References Cited

UNITED STATES PATENTS

| | | | |
|---|---|---|---|
| 2,635,057 | 4/1953 | Jordan | 106—308 X |
| 2,639,225 | 5/1953 | Venuto | 23—314 |
| 2,665,980 | 1/1954 | Carkeek | 48—212 |
| 2,955,097 | 10/1960 | White | 106—307 |
| 2,980,521 | 4/1961 | Dille et al. | 210—43 X |
| 2,980,522 | 4/1961 | Dille et al. | 210—43 X |
| 3,148,140 | 9/1964 | Kaiser et al. | 210—21 |
| 3,198,731 | 8/1965 | De Lew | 210—42 |

JOSEPH SCOVRONEK, *Acting Examiner.*

MORRIS O. WOLK, *Primary Examiner.*

E. G. WHITBY, *Assistant Examiner.*